United States Patent
Mao et al.

(10) Patent No.: US 9,369,048 B2
(45) Date of Patent: Jun. 14, 2016

(54) DIMMING EDGE DETECTION FOR POWER CONVERTER

(71) Applicant: Power Integrations, Inc., San Jose, CA (US)

(72) Inventors: Mingming Mao, Saratoga, CA (US); Ricardo Luis Janezic Pregitzer, Campbell, CA (US); Tiziano Pastore, Los Gatos, CA (US); Michael Yue Zhang, Mountain View, CA (US)

(73) Assignee: Power Integrations, Inc., San Jose, CA (US)

( * ) Notice: Subject to any disclaimer, the term of this patent is extended or adjusted under 35 U.S.C. 154(b) by 245 days.

(21) Appl. No.: 14/259,028

(22) Filed: Apr. 22, 2014

(65) Prior Publication Data

US 2015/0303812 A1   Oct. 22, 2015

(51) Int. Cl.
*H02M 3/335* (2006.01)
*H02M 5/293* (2006.01)
*H05B 33/08* (2006.01)

(52) U.S. Cl.
CPC .......... *H02M 3/33515* (2013.01); *H02M 5/293* (2013.01); *H05B 33/0815* (2013.01); *Y02B 20/346* (2013.01)

(58) Field of Classification Search
CPC   H02M 1/08; H02M 3/33515; H02M 3/33546
USPC ............... 363/20, 21.01, 21.04, 21.05, 21.12, 363/21.13, 97
See application file for complete search history.

(56) References Cited

U.S. PATENT DOCUMENTS

| | | | | |
|---|---|---|---|---|
| 2011/0266968 | A1* | 11/2011 | Bordin | H05B 33/0815 315/287 |
| 2013/0336020 | A1* | 12/2013 | Balakrishnan | H02M 3/335 363/21.13 |
| 2014/0240020 | A1* | 8/2014 | Kris | H02M 1/08 327/241 |
| 2015/0002040 | A1* | 1/2015 | Malyna | H05B 33/0815 315/201 |
| 2015/0062981 | A1* | 3/2015 | Fang | H02M 3/33507 363/21.17 |

(Continued)

FOREIGN PATENT DOCUMENTS

EP   2387294 A2   11/2011
WO   WO 2013/114242 A1   8/2013

OTHER PUBLICATIONS

EP Patent Application No. 15164258.4—European Search Report, mailed Jul. 10, 2015, 3 pages.

(Continued)

*Primary Examiner* — Jeffrey Sterrett
(74) *Attorney, Agent, or Firm* — Blakely Sokoloff Taylor & Zafman LLP (57) ABSTRACT

A controller for a power converter includes an edge detection circuit and a drive circuit. The edge detection circuit includes a comparator, a count module, and an edge checking module. The comparator is coupled to output a compare signal in response to comparing an input sense signal and a count signal. The input sense signal is representative of an input voltage of the power converter. The count module is coupled to adjust the count signal to track the input sense signal in response to receiving the compare signal. The edge checking module is coupled to output at least one edge signal in response to the compare signal. The drive circuit is coupled to output a drive signal in response to the at least one edge signal. The drive signal is for controlling a switch coupled to regulate an output of the power converter.

23 Claims, 7 Drawing Sheets

(56) References Cited

U.S. PATENT DOCUMENTS

| | | | |
|---|---|---|---|
| 2015/0207423 A1* | 7/2015 | Ganesh Kumar | H02M 3/33553 363/21.05 |
| 2015/0295500 A1* | 10/2015 | Mao | H02M 3/33515 363/21.13 |
| 2015/0303812 A1* | 10/2015 | Mao | H02M 3/33515 363/21.13 |
| 2016/0006341 A1* | 1/2016 | Mao | H02M 1/08 363/21.17 |

OTHER PUBLICATIONS

EP Patent Application No. 15164258.4—European Office Action, mailed Sep. 2, 2015, 4 pages.

U.S. Appl. No. 14/253,190, filed Apr. 15, 2014, Mao et al.

EP Patent Application No. 15164258.4—European Office Action, mailed Feb. 25, 2016, 4 pages.

* cited by examiner

DIMMING EDGE DETECTION FOR POWER CONVERTER

BACKGROUND INFORMATION

1. Field of the Disclosure

The present invention relates generally to power converters, and more specifically to power converters utilized with dimmer circuits.

2. Background

Electronic devices use power to operate. Switched mode power converters are commonly used due to their high efficiency, small size and low weight to power many of today's electronics. Conventional wall sockets provide a high voltage alternating current. In a switching power converter a high voltage alternating current (ac) input is converted to provide a well regulated direct current (dc) output through an energy transfer element. The switched mode power converter control circuit usually provides output regulation by sensing one or more inputs representative of one or more output quantities and controlling the output in a closed loop. In operation, a switch is utilized to provide the desired output by varying the duty cycle (typically the ratio of the on time of the switch to the total switching period), varying the switching frequency or varying the number of pulses per unit time of the switch in a switched mode power converter.

In one type of dimming for lighting applications, a triac dimmer circuit typically disconnects a portion of the ac input voltage to limit the amount of voltage and current supplied to an incandescent lamp. This is known as phase dimming because it is often convenient to designate the position of the triac dimmer circuit and the resultant amount of missing voltage in terms of a fraction of the period of the ac input voltage measured in degrees. In general, the ac input voltage is a sinusoidal waveform and the period of the ac input voltage is referred to as a full line cycle. As such, half the period of the ac input voltage is referred to as a half line cycle. An entire period has 360 degrees, and a half line cycle has 180 degrees. Typically, the phase angle is a measure of how many degrees (from a reference of zero degrees) of each half line cycle the triac dimmer circuit disconnects the ac input. As such, removal of half the ac input voltage in a half line cycle by the triac dimmer circuit corresponds to a phase angle of 90 degrees. In another example, removal of a quarter of the ac input voltage in a half line cycle may correspond to a phase angle of 45 degrees.

On the other hand, the conduction angle is a measure of how many degrees (from a reference of zero degrees) of each half line cycle the triac dimmer circuit does not disconnect a portion of the ac input voltage from the power converter. Or in other words, the conduction angle is a measure of how many degrees of each half line cycle in which the triac dimmer circuit is conducting. In one example, the removal of a quarter of the ac input voltage in a half line cycle may correspond to a phase angle of 45 degrees but a conduction angle of 135 degrees.

Although phase angle dimming works well with incandescent lamps that receive the altered ac input voltage directly, it typically creates problems for light emitting diode (LED) lamps. LED lamps often require a regulated power converter to provide regulated current and voltage from the ac power line. Most LEDs and Led modules are best driven by a regulated current which a regulated power converter may provide from an ac power line. Triac dimmer circuits typically don't work well with conventional regulated power converter controllers. Regulated power converters are typically designed to ignore distortions of the ac input voltage. Their purpose is to deliver a constant regulated output until a low input RMS voltage causes them to shut off completely. As such, conventional regulated power supplies would not dim the LED lamp. Unless a power converter for an LED lamp is specially designed to recognize and respond to the voltage from a triac dimmer circuit in a desirable way, a triac dimmer is likely to produce unacceptable results such as flickering or shimmering of the LED lamp with large conduction angles and flashing of the LED lamp at low conduction angles. Thus, a power converter may include an improved conventional power converter controller that is designed to respond to a triac dimmer circuit by directly sensing the average value of the dimmer circuit output (in other words, the average value of the ac input voltage after the triac dimmer circuit has removed a portion of the ac input voltage) to determine the amount of dimming requested. In general, a smaller average value of the dimmer circuit output would correspond to a removal of a greater portion of the ac input voltage and thus a larger phase angle. As such, the improved conventional power converter controller utilizes this relationship to indirectly determine the phase angle and alter the quantity to which the output of the power converter is regulated. However, by indirectly measuring the phase angle in this manner, the amount of dimming detected (and hence the quantity to which the output of the power converter is regulated) is subject to variances of the ac input voltage. In other words, the accuracy of the phase angle measured through the average value of the dimmer circuit output is dependent on variances of the ac input voltage.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

For phase dimming applications, including those for light emitting diodes (LED), a phase dimmer circuit typically disconnects the ac input voltage for a portion of every half line cycle to limit the amount of voltage and current supplied to the LEDs. As mentioned above, typically, the phase angle is a measure of how many degrees of each half line cycle the dimmer circuit has disconnected the input. Alternatively, the amount of the ac input voltage which the dimmer circuit does not disconnect may be referred to as the conduction angle. As such, the amount of dimming set by the dimmer circuit may be determined by measuring the amount of time which the ac input voltage is disconnected (i.e., the amount of time which the dimmer circuit is not conducting) or the amount of time which the ac input voltage is not disconnected (i.e. the amount of time which the dimmer circuit is conducting).

The amount of dimming set by the dimmer circuit may be directly measured from input voltage of the power converter. One way which the conduction angle (or phase angle) may be measured by threshold detection where the input voltage may be compared to a reference threshold. The amount of time which the input voltage is above the reference may correspond to the conduction angle of the dimmer circuit. Alternatively, the amount of time which the input voltage is below the reference may correspond to the phase angle. However, measuring the conduction angle (or phase angle) utilizing threshold detection may be inaccurate due to leakage energy and capacitors in the power supply which prevent the input voltage falling to substantially zero.

However, as will be illustrated, when a dimmer circuit is utilized an "edge" may be observed in the waveform of input voltage of the power supply. For a leading edge dimmer circuit, in general the input voltage is substantially zero until the dimmer circuit conducts. Once the dimmer circuit begins to conduct, the input voltage rapidly increases and follows the ac input voltage. For a trailing edge dimmer circuit, the input voltage substantially follows the ac input voltage until the dimmer circuit does not conduct and the input voltage rapidly decreases to substantially zero. The rapid increase or decrease may be referred to as an edge.

In one example of the present invention, an edge detection circuit may be utilized to determine if the dimmer circuit is or is not conducting. Once an edge is detected, the conduction angle (or phase angle) may be measured. For examples of the present invention, the edge detection circuit may generate a count signal which tracks the input of the power converter. If the count signal is unable the track the input of the power converter for a given amount of time, an edge in the input is detected. In one example, the count signal is a rectangular pulse waveform with varying lengths of logic high and logic low sections. When the count signal is tracking the input, the count signal increases and decreases within the given amount of time. However, if the count signal is no longer tracking the input, the count signal may substantially increase within the given amount of time or substantially decrease within the given amount of time.

Figure 1:
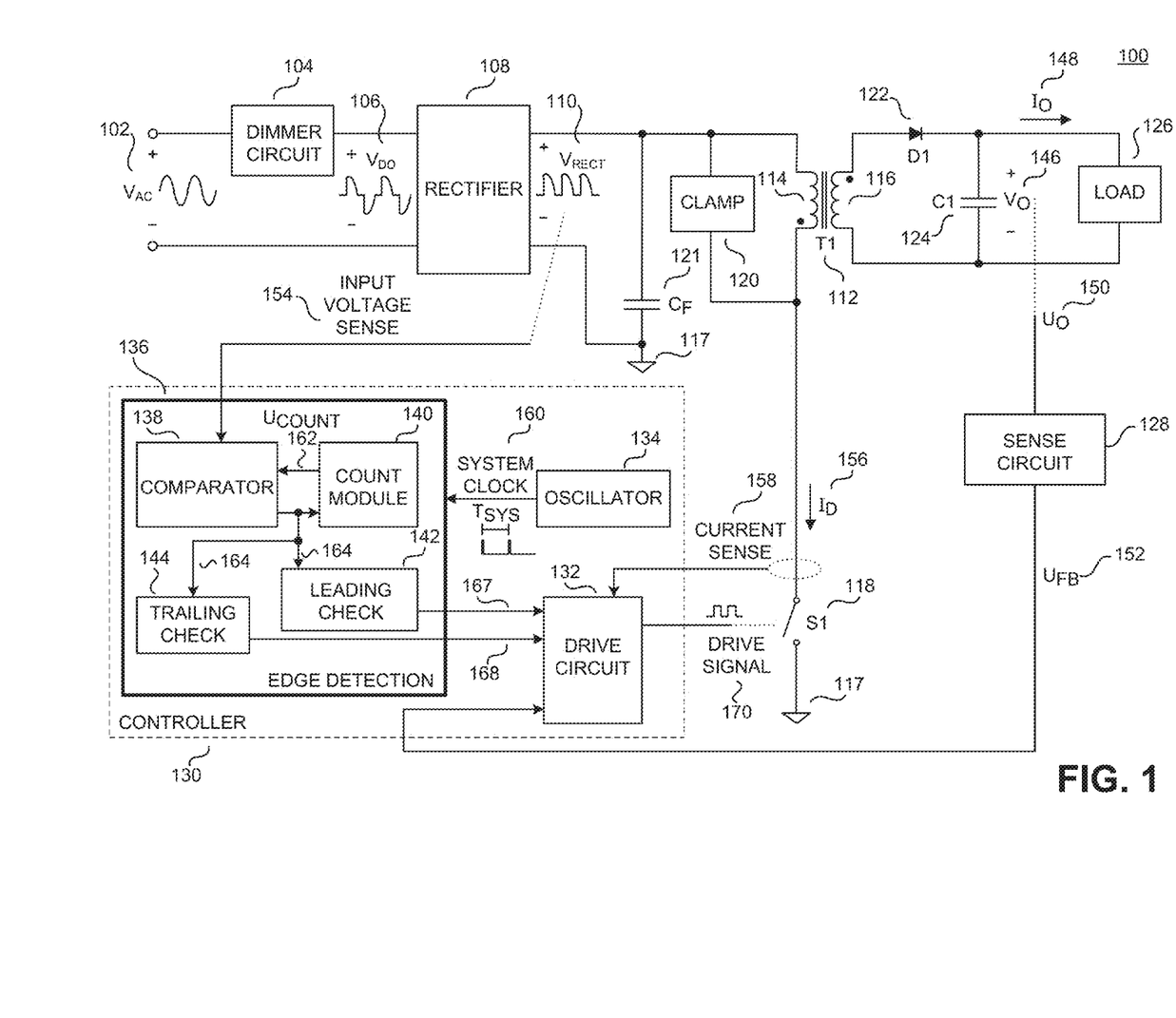
FIG. 1 is a functional block diagram illustrating an example power converter with a dimmer circuit utilizing a controller in accordance with an example of the present invention.

Referring first to FIG. 1, a functional block diagram of an example power converter 100 is illustrated including ac input voltage $V_{AC}$ 102, a dimmer circuit 104, a dimmer output voltage $V_{DO}$ 106, a rectifier 108, a rectified voltage $V_{RECT}$ 110, an energy transfer element T1 112, a primary winding 114 of the energy transfer element T1 112, a secondary winding 116 of the energy transfer element T1 112, a switch S1 118, input return 117, a clamp circuit 120, a rectifier D1 122, an input capacitor $C_F$ 121, an output capacitor C1 124, a load 126, a sense circuit 128, and a controller 130. Controller 130 further includes a drive circuit block 132, an oscillator 134, and an edge detection circuit 136. Edge detection circuit 136 is shown as including a comparator 138, a count module 140, and an edge checking module that includes a leading edge check block 142 and/or a trailing edge check block 144. In one example, sense circuit 128 may also be included in controller 130. FIG. 1 further illustrates an output voltage $V_O$ 146, an output current $I_O$ 148, an output quantity $U_O$ 150, a feedback signal $U_{FB}$ 152, a voltage sense signal 154, a switch current $I_D$ 156, a current sense signal 158, a system clock 160, a count signal 162, a compare signal 164, leading edge signal $U_{LE}$ 167, a trailing edge signal $U_{TE}$ 168, and a drive signal 170. The example switched mode power converter 100 illustrated in FIG. 1 is coupled in a flyback configuration, which is just one example of a switched mode power converter that may benefit from the teachings of the present invention. It is appreciated that other known topologies and configurations of switched mode power converter may also benefit from the teachings of the present invention. In addition, the example power converter in FIG. 1 is an isolated power converter. It should be appreciated that non-isolated power converters may also benefit from the teachings of the present invention.

The power converter 100 provides output power to the load 126 from an unregulated input voltage. In one embodiment, the input voltage is the ac input voltage $V_{AC}$ 102. In another embodiment, the input voltage is a rectified ac input voltage such as rectified voltage $V_{RECT}$ 110. As shown, dimmer circuit 104 receives the ac input voltage $V_{AC}$ 102 and produces the dimmer output voltage $V_{DO}$ 106. The dimmer circuit 104 may be utilized to limit the voltage delivered to the power converter 100. In one embodiment, the dimmer circuit 104 may be a phase dimming circuit such as a triac phase dimmer. The dimmer circuit 104 further couples to the rectifier 108 and the dimmer output voltage $V_{DO}$ 106 is received by the rectifier 108.

The rectifier 108 outputs rectified voltage $V_{RECT}$ 110. In one embodiment, rectifier 108 may be a bridge rectifier. The rectifier 108 further couples to the energy transfer element T1 112. In some embodiments of the present invention, the energy transfer element T1 112 may be a coupled inductor. In a further example, the energy transfer element 110 may be an inductor. In other embodiments, the energy transfer element T1 112 may be a transformer. In the example of FIG. 1, the energy transfer element T1 112 includes two windings, a primary winding 114 and a secondary winding 116. However, it should be appreciated that the energy transfer element T1 112 may have more than two windings. In the example of FIG. 1, primary winding 114 may be considered an input winding, and secondary winding 116 may be considered an output winding. The primary winding 114 is further coupled to switch S1 118, which is then further coupled to input return 117.

In addition, the clamp circuit 120 is illustrated in the example of FIG. 1 as being coupled across the primary winding 114 of the energy transfer element T1 112. The filter capacitor $C_F$ 121 may couple across the primary winding 114 and switch S1 118. In other words, the filter capacitor $C_F$ 121 may couple to the rectifier 108 and input return 117. Secondary winding 116 of the energy transfer element T1 112 is coupled to the rectifier D1 122. In the example of FIG. 1, the rectifier D1 122 is exemplified as a diode. However, in some embodiments the rectifier D1 122 may be a transistor used as a synchronous rectifier. Both the output capacitor C1 124 and the load 126 are shown in FIG. 1 as being coupled to the rectifier D1 122. An output is provided to the load 126 and may be provided as either a regulated output voltage $V_O$ 146, regulated output current $I_O$ 148, or a combination of the two. In one embodiment, load 126 may be a light emitting diode (LED), an LED module, or an LED array.

The power converter 100 further comprises circuitry to regulate the output which is exemplified as output quantity $U_O$ 150. In general, the output quantity $U_O$ 150 is either an output voltage $V_O$ 146, an output current $I_O$ 148, or a combination of the two. A sense circuit 128 is coupled to sense the output quantity $U_O$ 150 and to provide feedback signal $U_{FB}$ 152, which is representative of the output quantity $U_O$ 150. Feedback signal $U_{FB}$ 152 may be a voltage signal or a current signal. In one example, the sense circuit 128 may sense the output quantity $U_O$ 150 from an additional winding included in the energy transfer element T1 112. In another example, there may be a galvanic isolation (not shown) between the controller 130 and the sense circuit 128. The galvanic isolation could be implemented by using devices such as an optocoupler, a capacitor or a magnetic coupling. In a further example, the sense circuit 128 may utilize a voltage divider to sense the output quantity $U_O$ 150 from the output of the power converter 100.

Controller 130 is coupled to the sense circuit 128 and receives the feedback signal $U_{FB}$ 152 from the sense circuit 128. The controller 130 further includes terminals for receiving the voltage sense signal 154, current sense signal 158 and for providing the drive signal 170 to power switch S1 118. In the example of FIG. 1, the voltage sense signal 154 may be representative of the rectified voltage $V_{RECT}$ 110. However, in other examples the voltage sense signal 154 may be representative of the dimmer output voltage $V_{DO}$ 106. The voltage sense signal 158 may be a voltage signal or a current signal. The current sense signal 158 may be representative of the switch current $I_D$ 156 in the power switch S1 118. Current sense signal 158 may be a voltage signal or a current signal. In addition, the controller 130 provides drive signal 170 to the power switch S1 118 to control various switching parameters to control the transfer of energy from the input of power converter 100 to the output of power converter 100. Examples of such parameters may include switching frequency, switching period, duty cycle, or respective ON and OFF times of the power switch S1 118.

As illustrated in the example of FIG. 1, controller 130 includes the drive circuit 132, oscillator 134, and the edge detection circuit 136. The drive circuit is coupled to output the drive signal 170 to control switching of the power switch S1 116 in response to the one or more outputs of the edge detection circuit 136 and/or the feedback signal $U_{FB}$ 152. In addition, the drive circuit may also be coupled to be responsive to the current sense signal 158. Although a single controller is illustrated in FIG. 1, it should be appreciated that multiple controllers may be utilized by the power converter 100. In addition, the drive circuit 132, oscillator 134, and edge detection circuit 136 need not be within a single controller. For example, the power converter 100 may have a primary controller coupled to the input side of the power converter 100 and a secondary controller coupled to the output side of the power converter 100.

In the example illustrated, the edge detection circuit 136 includes the comparator 138, count module 140, leading edge check block 142 and the trailing edge check block 144. However, it should be appreciated that the edge detection circuit 136 may include either the leading edge check block 142 or the trailing edge check block 144, or both in its edge checking module (not illustrated). Edge detection circuit 136 is coupled to receive the voltage sense signal 154 and the system clock 160 and output the leading edge signal $U_{LE}$ 167 or the trailing edge signal $U_{TE}$ 168, or both signals. The leading edge signal $U_{LE}$ 167 and the trailing edge signal $U_{TE}$ 168 confirm whether a leading edge dimmer circuit or a trailing edge dimmer circuit is detected (respectively). Although not shown for clarity, count module 140, leading edge check block 142, and trailing edge check block 144 may all be coupled to receive the system clock 160.

Comparator 138 is coupled to output compare signal 164 in response to comparing input sense signal 154 and count signal 162. As illustrated, comparator 138 receives the voltage sense signal 154 and count signal $U_{COUNT}$ 162 from the count module 140 and outputs the result of the comparison to the count module 140, leading edge check block 142, and the trailing edge check block 144. Count module 140 is coupled to adjust count signal 162 to track input sense signal 154 in response to receiving compare signal 164. In particular, count module 140 varies the count signal $U_{COUNT}$ 162 in response to the comparison of the voltage sense signal 154 with the count signal $U_{COUNT}$ 162, as will be discussed further. In one example, the count module 140 increases the count signal $U_{COUNT}$ 162 if the input voltage provided by the voltage sense signal 154 is greater than the count signal $U_{COUNT}$ 162 and decreases the count signal $U_{COUNT}$ 162 if the input voltage provided by the voltage sense signal 154 is less than the count signal $U_{COUNT}$ 162.

Leading edge check block 142 and trailing edge check block 144 each receive the output of the comparator 138 and determines whether a leading edge or a trailing edge is detected and outputs the leading edge signal $U_{LE}$ 167 and the trailing edge signal $U_{TE}$ 168, respectively to the drive circuit 132. As will be further discussed, the leading edge check block 142 and trailing edge check block 144 output a leading edge or trailing edge signal in response to compare signal 164 not changing between a first state and a second state for a given time period. In other words, the leading edge check block 142 outputs a leading edge signal if the count signal $U_{COUNT}$ 162 is less than the voltage sense signal 154 for a given amount of time. In addition, the trailing edge check block 144 outputs the trailing edge signal if the count signal $U_{COUNT}$ 162 is greater than the voltage sense signal 154 for a given amount of time.

In operation, the power converter 100 of FIG. 1 provides output power to the load 126 from an unregulated input such as the ac input voltage $V_{AC}$ 102. The dimmer circuit 104 may be utilized to limit the amount of voltage delivered to the power converter. For the example of a LED load, when the dimmer circuit 104 limits the amount of voltage delivered to the power converter, the resultant current delivered to the load of LED arrays by the controller 130 is also limited and the LED array dims. As mentioned above, the dimmer circuit 104 may be a phase dimming circuit such as a triac dimmer circuit or a Metal-Oxide-Semiconductor Field Effect Transistor ("MOSFET") dimmer circuit. For leading edge dimming, the dimmer circuit 104 disconnects the ac input voltage $V_{AC}$ 102 when the ac input voltage $V_{AC}$ 102 crosses zero voltage. After a given amount of time, the dimmer circuit 104 reconnects the ac input voltage $V_{AC}$ 102 with the power converter 100. The amount of time before the dimmer circuit reconnects the ac input voltage $V_{AC}$ 102 is set by a user. For trailing edge dimming, the dimmer circuit 104 connects the input to the power converter when the ac input voltage $V_{AC}$ 102 crosses zero voltage. After a given amount of time set by a user, the dimmer circuit 104 then disconnects the ac input voltage $V_{AC}$ 102 for the remainder of the half cycle. In other words, the dimmer circuit 104 may interrupt the phase of the ac input voltage $V_{AC}$ 102. Depending on the amount of dimming wanted the dimmer circuit 104 controls the amount of time the ac input voltage $V_{AC}$ 102 is disconnected from the power converter. In general, the more dimming wanted corresponds to a longer period of time during which the dimming circuit 104 disconnects the ac input voltage $V_{AC}$ 102.

The dimmer circuit 104 produces the dimmer output voltage $V_{DO}$ 106 which is received by rectifier 108. The rectifier 108 produces the rectified voltage $V_{RECT}$ 110. The filter capacitor $C_F$ 121 filters the high frequency current from the switch S1 118. For other applications, the filter capacitor $C_F$ 121 may be large enough such that a substantially dc voltage is applied to the energy transfer element T1 112. However, for power supplies with power factor correction (PFC), a small filter capacitor $C_F$ 121 may be utilized to allow the voltage applied to the energy transfer element T1 112 to substantially follow the rectified voltage $V_{RECT}$ 110. As such, the value of the filter capacitor $C_F$ 121 may be chosen such that the voltage on the filter capacitor $C_F$ 121 reaches substantially zero during each half-line cycle of the ac input voltage $V_{AC}$ 102. Or in other words, the voltage on the filter capacitor $C_F$ 121 substantially follows the positive magnitude of the dimmer output voltage $V_{DO}$ 106. As such, the controller 130 may detect when the dimmer circuit 104 disconnects and reconnects the ac input voltage $V_{AC}$ 102 from the power converter 100 by sensing the voltage on the filter capacitor $C_F$ 121 (or in other words the rectified voltage $V_{RECT}$ 110). In another embodiment, the controller 130 may detect when the dimmer circuit 104 disconnects and reconnects the ac input voltage $V_{AC}$ 102 from the power converter 100 by sensing the switch current $I_D$ 156. In a further example, the controller 130 may detect that the dimmer circuit 103 disconnects and reconnects the ac input voltage $V_{AC}$ 102 from the power converter 100 by sensing the input current (in one example, the current flowing between the rectifier 108 and the capacitor $C_F$ 121).

The switching power converter 100 utilizes the energy transfer element T1 112 to transfer voltage between the primary 114 and the secondary 116 windings. The clamp circuit 120 is coupled to the primary winding 114 to limit the maximum voltage on the switch S1 118. Switch S1 118 is opened and closed in response to the drive signal 170. It is generally understood that a switch that is closed may conduct current and is considered on, while a switch that is open cannot conduct current and is considered off. In one example, the switch S1 118 may be a transistor such as a metal-oxide-semiconductor field-effect transistor (MOSFET). In another example, controller 130 may be implemented as a monolithic integrated circuit or may be implemented with discrete electrical components or a combination of discrete and integrated components. Controller 130 and switch S1 118 could form part of an integrated circuit that is manufactured as either a hybrid or monolithic integrated circuit. In operation, the switching of the switch S1 118 produces a pulsating current at the rectifier D1 122. The current in the rectifier D1 122 is filtered by the output capacitor C1 124 to produce a substantially constant output voltage $V_O$ 146, output current $I_O$ 148, or a combination of the two at the load 126.

The sense circuit 128 senses the output quantity $U_O$ 150 of the power converter 100 to provide the feedback signal $U_{FB}$ 152 to the controller 130. The feedback signal $U_{FB}$ 152 may be a voltage signal or a current signal and provides information regarding the output quantity $U_O$ 152 to the controller 130. In addition, the controller 130 receives the current sense input signal 158 which relays the switch current $I_D$ 156 in the switch S1 118. The switch current $I_D$ 156 may be sensed in a variety of ways, such as for example the voltage across a discrete resistor or the voltage across a transistor when the transistor is conducting. In addition, the controller 130 may receive the voltage sense input signal 154 which relays the value of the rectified voltage $V_{RECT}$ 110. The rectified voltage $V_{RECT}$ 110 may be sensed a variety of ways, such as for example through a resistor divider.

Edge detection circuit 136 is coupled to output the leading edge signal $U_{LE}$ 167 or the trailing edge signal $U_{TE}$ 168 in response to the voltage sense signal 154 if a leading edge or a trailing edge is detected. Leading edge signal $U_{LE}$ 167 or the trailing edge signal $U_{TE}$ 168 may be analog or digital signals with a logic high value corresponding to an edge being detected and a logic low value corresponding to no edge detected. As will be further discussed, the comparator 138 compares the rectified voltage $V_{RECT}$ 110 (via voltage sense 154) with the count signal $U_{COUNT}$ 162. If the rectified voltage $V_{RECT}$ 110 is greater than the count signal $U_{COUNT}$ 162, count module 140 increments the value of the count signal $U_{COUNT}$ 162. If the rectified voltage $V_{RECT}$ 110 is less than the count signal $U_{COUNT}$ 162, then count module 140 decrements the value of the count signal $U_{COUNT}$ 162. As such, when the dimmer circuit 104 is not disconnecting the ac input voltage $V_{AC}$ 102 from the power converter, the count signal $U_{COUNT}$ 162 substantially tracks the rectified voltage $V_{RECT}$ 110. In other words, the value of the count signal $U_{COUNT}$ 162 increases and decreases within a given amount of time to track rectified voltage $V_{RECT}$ 110. However, if the dimmer circuit 104 is disconnecting the ac input voltage $V_{AC}$ 102 from the power converter, the count signal $U_{COUNT}$ 162 loses track of the rectified voltage $V_{RECT}$ 110 and either consistently increases or decreases depending if the dimmer circuit 104 is a leading or trailing edge dimmer. In one example, the count signal $U_{COUNT}$ 162 is unable to track the edges of the rectified voltage $V_{RECT}$ 110 due to the frequency of the system clock 160 in comparison to the frequency of the edge.

For the example of a leading edge dimmer, the rectified voltage $V_{RECT}$ 110 sharply increases once the dimmer circuit 104 fires. As such, the rectified voltage $V_{RECT}$ 110 is greater than the count signal $U_{COUNT}$ 162 for a given amount of time. The leading edge check block 142 receives compare signal 164 from comparator 138 and asserts the leading edge signal $U_{LE}$ 167 if the rectified voltage $V_{RECT}$ 110 is greater than the count signal $U_{COUNT}$ 162 for a given amount of time. For the example of a trailing edge dimmer, the rectified voltage $V_{RECT}$ 110 sharply decreases once the dimmer circuit is disconnected. As such the rectified voltage $V_{RECT}$ 110 is less than the count signal $U_{COUNT}$ 162 for a given amount of time. The trailing edge check block 144 receives compare signal 164 and asserts the trailing edge signal $U_{TE}$ 168 if the rectified voltage $V_{RECT}$ 110 is less than the count signal $U_{COUNT}$ 162 for a given amount of time.

Figure 2:
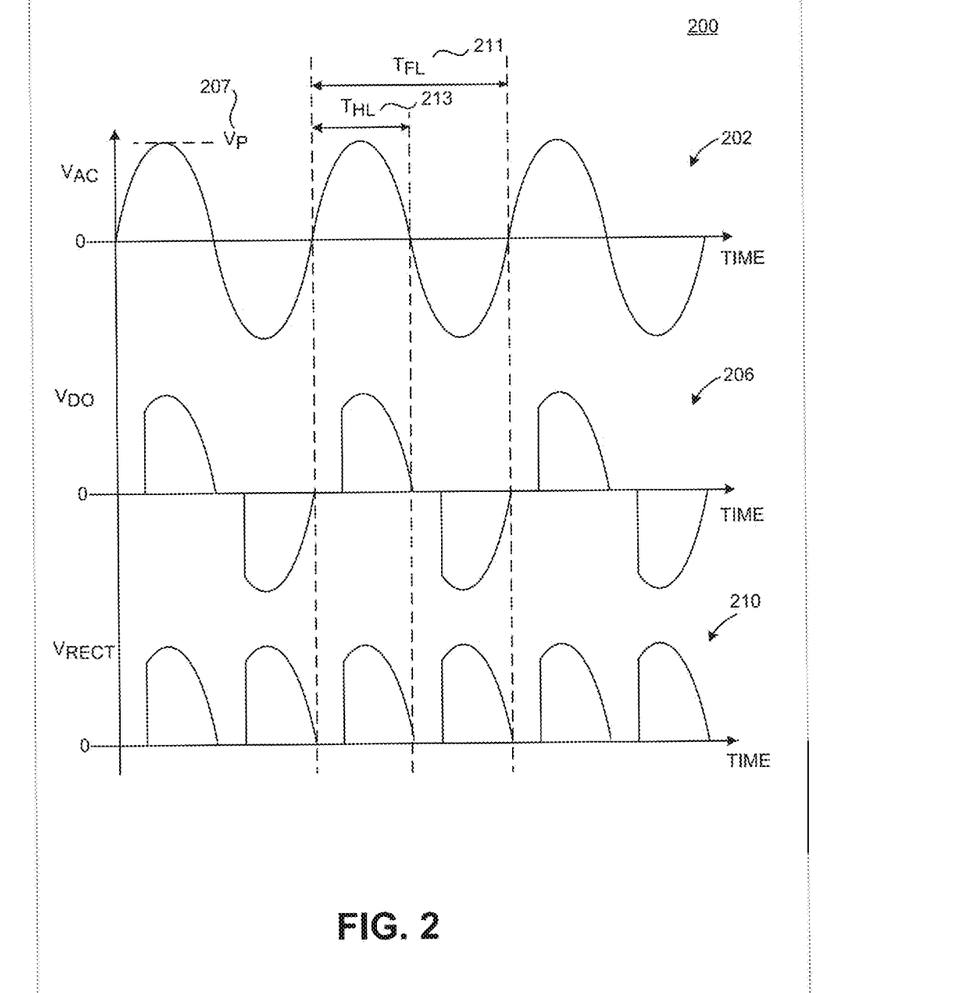
FIG. 2 is a diagram illustrating example waveforms of an ac input voltage, an output voltage of a dimmer circuit, and an output of a rectifier circuit of FIG. 1 in accordance with an example of the present invention.

FIG. 2 illustrates example waveforms of an ac input voltage 202, a dimmer output voltage $V_{DO}$ 206, and a rectified voltage $V_{RECT}$ 210. In particular, FIG. 2 illustrates the dimmer output voltage $V_{DO}$ 206 and a resultant rectified voltage $V_{RECT}$ 210 for leading edge triac dimming.

In general, the ac input voltage $V_{AC}$ 202 is a sinusoidal waveform with the period of the ac input voltage $V_{AC}$ 202 referred to as a full line cycle $T_{FL}$ 211. Mathematically: $V_{AC}=V_P \sin(2\pi f_L t)$. Where $V_P$ 207 is the peak voltage of the ac input voltage $V_{AC}$ and $f_L$ is the frequency of the ac input voltage. It should be appreciated that the full line cycle $T_{FL}$ 211 is the reciprocal of the line frequency $f_L$, or mathematically:

$$T_{FL} = \frac{1}{f_L}.$$

As shown in FIG. 2, a full line cycle $T_{HL}$ 211 of the ac input voltage 202 is denoted as the length of time between every other zero-crossing of the ac input voltage 202. Further, the half line cycle $T_{HL}$ 213 is the reciprocal of double the line frequency, or mathematically:

$$T_{HL} = \frac{1}{2f_L}.$$

As shown, the half line cycle $T_{HL}$ 213 of the ac input voltage $V_{AC}$ 202 is denoted as the length of time between consecutive zero-crossings.

For leading edge dimming, the dimmer circuit 104 disconnects the ac input voltage $V_{AC}$ 202 from the power converter when the ac input voltage $V_{AC}$ 202 substantially crosses zero voltage. After a given amount of time, the dimmer circuit 104 reconnects the ac input voltage $V_{AC}$ 202 with the power converter 100 and the dimmer output voltage $V_{DO}$ 206 substantially follows the ac input voltage $V_{AC}$ 202. In other words, the dimmer circuit 104 disconnects the ac input voltage 202 for a portion of the half line cycle to provide the dimmer output voltage $V_{DO}$ 206 thus limiting the amount of voltage and current supplied to a load (such as an LED lamp). The rectifier circuit 104 rectifies the dimmer output voltage $V_{DO}$ 206 thus providing the rectified voltage $V_{RECT}$ 210 as shown. For the example of FIG. 2, the beginning of each half line cycle $T_{HL}$ 202 of the rectified voltage $V_{RECT}$ 210 is substantially equal to zero voltage corresponding to when the dimmer circuit 104 disconnects the ac input voltage $V_{AC}$ 202 from the power converter. When the dimmer circuit 104 reconnects the ac input voltage $V_{AC}$ 102 to the power converter, the rectified voltage $V_{RECT}$ 210 substantially follows the positive magnitude of the dimmer output voltage $V_{DO}$ 206 and the ac input voltage $V_{AC}$ 202. Or mathematically: $V_{RECT}=|V_{DO}|$. As shown the dimmer output voltage $V_{DO}$ 206 sharply increases (or decreases) to substantially follow the ac input voltage $V_{AC}$ 202. The sharp increase is also illustrated in the example waveform of the rectified voltage $V_{RECT}$ 210. The sharp increase may be referred to as the "edge."

Figure 3A:
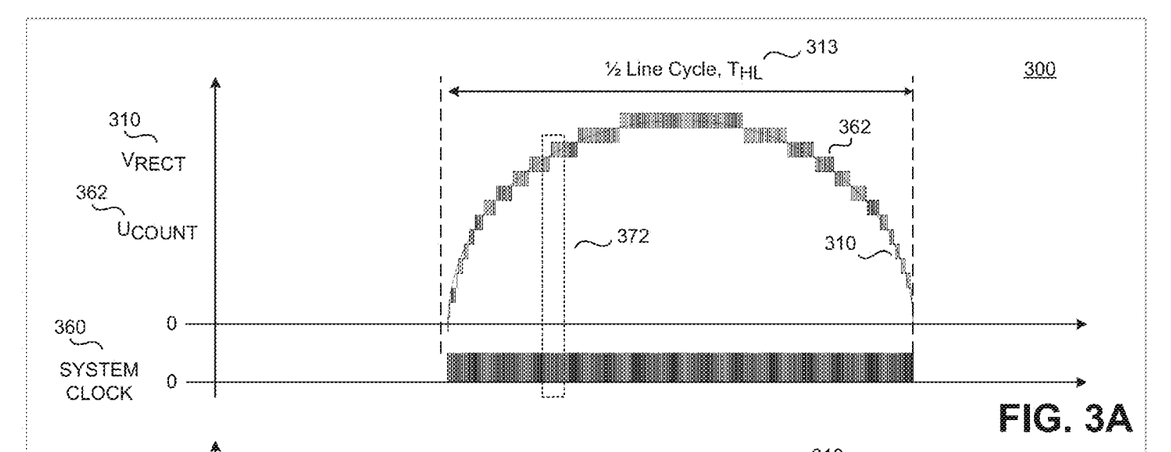
FIG. 3A is a diagram illustrating example waveforms of a rectified input voltage waveform, a system clock, and a count signal of the power converter of FIG. 1 in accordance with an example of the present invention.
Figure 3B:
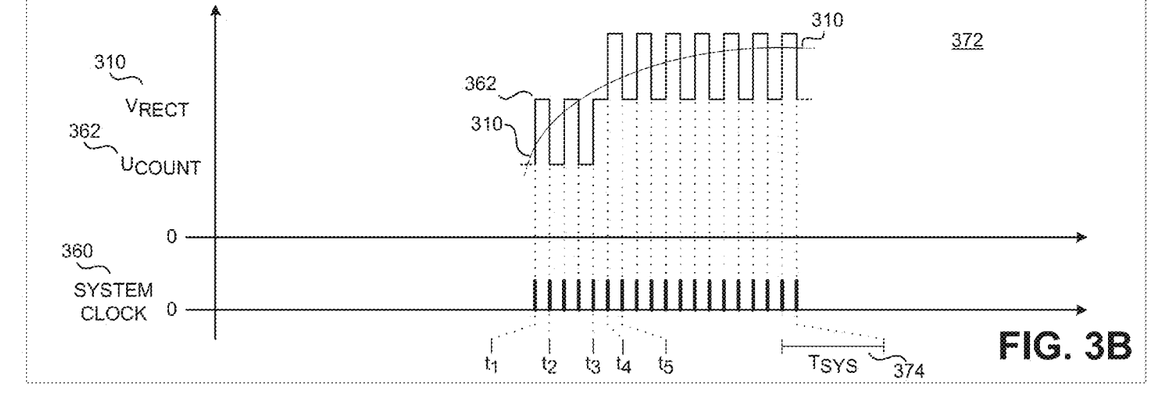
FIG. 3B is a diagram illustrating a portion of the example waveforms of the rectified input voltage waveform, system clock, and count signal shown in FIG. 3A in accordance with an example of the present invention.

Referring next to FIG. 3A, example waveforms of the rectified voltage $V_{RECT}$ 310, system clock 360, and the count signal $U_{COUNT}$ 362 of the switching power converter 100 are illustrated including half line cycle $T_{HL}$ 313, system period $T_{SYS}$ 374, and times $t_1$-$t_5$. Further, FIG. 3B illustrates the rectified voltage $V_{RECT}$ 310, system clock 360, and the count signal $U_{COUNT}$ 362 for the portion 372 of FIG. 3A. It should be appreciated that only one half line cycle $T_{HL}$ 313 is illustrated for clarity.

FIG. 3A illustrates one half line cycle $T_{HL}$ 313 of the rectified voltage $V_{RECT}$ 310, system clock 360, and the count signal $U_{COUNT}$ 362 when the dimmer circuit is not disconnecting a portion of the ac input voltage $V_{AC}$ 102 from the power converter 100. Although only one half line cycle $T_{HL}$ 313 is shown, the rectified voltage $V_{RECT}$ 310 has a substantially sinusoidal shape with no edges. The system clock 360 is shown as a rectangular pulse waveform with logic high and logic low sections. In the example shown, the period of the system clock $T_{SYS}$ 374 is shorter than the one half line cycle $T_{HL}$ 313. Or in other words, the frequency of the system clock 360 is faster than the line frequency of the ac input voltage $V_{AC}$ 102. FIG. 3A illustrates the system clock 360 as notches to demonstrate that the system period $T_{SYS}$ 374 is shorter than the full and half line cycle. In one example, the full line cycle $T_{FL}$ 311 is 4096 times greater than the system period $T_{SYS}$ 374 of the system clock 360.

Count signal $U_{COUNT}$ 362 is a rectangular pulse waveform which may have multiple values, in the illustrated embodiment. In the alternative, $U_{COUNT}$ 362 may be a digital number broadcasted as a digital word. In one example, the count signal $U_{COUNT}$ 362 may be an analog representation of a digital number. For example, the value (or magnitude) of the count signal $U_{COUNT}$ 362 may correspond to a digital number. As illustrated, the count signal $U_{COUNT}$ 362 substantially follows the rectified voltage $V_{RECT}$ 310 or at least a scaled-down version of $V_{RECT}$ 310 (e.g. input sense signal 154). In one example, the count signal $U_{COUNT}$ 362 increases and decreases such that the count signal $U_{COUNT}$ 362 crosses the rectified voltage $V_{RECT}$ 310 within a given amount of time. The given amount of time may be N number of consecutive system periods $T_{SYS}$ 374. In other words, the count signal $U_{COUNT}$ 362 substantially tracks the rectified voltage $V_{RECT}$ 310 if the count signal $U_{COUNT}$ 362 crosses the rectified voltage $V_{RECT}$ 310 within N number of consecutive system periods $T_{SYS}$ 374. In one example, N may be substantially equal to 10.

FIG. 3B illustrates the portion 372 of FIG. 3A. As shown in FIG. 3B, the count signal $U_{COUNT}$ 362 may cross the rectified voltage $V_{RECT}$ 310 several times. In the example shown, times $t_1$-$t_5$ correspond to the rising edges of the system clock 360 and the time between rising edges is substantially the system period $T_{SYS}$ 374. At time $t_1$ of the system clock 360, the value of count signal $U_{COUNT}$ 362 is less than rectified voltage $V_{RECT}$ 310. Comparator 138 gives compare signal 164 a second state (e.g. logic high) when $U_{COUNT}$ 362 is less than $V_{RECT}$ 310. The count module 140 then increments the count signal $U_{COUNT}$ 362 in response to compare signal 164 having the second state and the value of the count signal $U_{COUNT}$ 362 increases and crosses rectified voltage $V_{RECT}$ 310. At time $t_2$ of the system clock 360, the value of the count signal $U_{COUNT}$ 362 is greater than the rectified voltage $V_{RECT}$ 310. As such, comparator 138 gives compare signal 164 a first state (e.g. logic low) when $U_{COUNT}$ 362 is greater than $V_{RECT}$ 310. Count module 140 decrements the count signal $U_{COUNT}$ 362 in response to compare signal 164 having the first state and the value of the count signal $U_{COUNT}$ 362 decreases and crosses the rectified voltage $V_{RECT}$ 310. In one example, the amounts which the count signal $U_{COUNT}$ 362 increases and decreases may be fixed and the resultant value after each increase and decrease may correspond to a digital count.

At time $t_3$ of the system clock 360, the value of the count signal $U_{COUNT}$ 362 is less than the rectified voltage $V_{RECT}$ 310. As such, the value of the count signal $U_{COUNT}$ 362 is increased in response to compare signal 164 having the second state. However, the value of the count signal $U_{COUNT}$ 362 at next system clock period (shown as time $t_4$) is still less than the rectified voltage $V_{RECT}$ 310. Count module 140 further increments the count signal $U_{COUNT}$ 362 and the value of the count signal $U_{COUNT}$ 362 increases to the next value. At time t4, the count signal $U_{COUNT}$ 362 crosses rectified voltage $V_{RECT}$ 310. At the next system clock period (shown as time $t_5$), the value of the count signal $U_{COUNT}$ 362 is greater than the rectified voltage $V_{RECT}$ 310 and the value of the count signal $U_{COUNT}$ 362 decreases. As shown at time $t_5$, the count signal $U_{COUNT}$ 362 crosses rectified voltage $V_{RECT}$ 310. In the example shown in FIG. 3B, the count signal $U_{COUNT}$ 362 does not cross the rectified voltage $V_{RECT}$ 310 for two consecutive switching periods $T_{SYS}$ 374 of the system clock. As mentioned above, the count signal $U_{COUNT}$ 362 substantially tracks the rectified voltage $V_{RECT}$ 310 if the count signal $U_{COUNT}$ 362 crosses the rectified voltage $V_{RECT}$ 310 within N number of consecutive system periods $T_{SYS}$ 374. In the example where N is substantially equal to 10, the count signal $U_{COUNT}$ 362 illustrated in FIG. 3B is still tracking the rectified voltage $V_{RECT}$ 310 or at least a scaled version of $V_{RECT}$ 310 (e.g. input sense signal 154) since the number of consecutive switching periods which the count signal $U_{COUNT}$ 362 does not cross the rectified voltage $V_{RECT}$ 310 (i.e. 2) is less than 10.

Figure 4A:
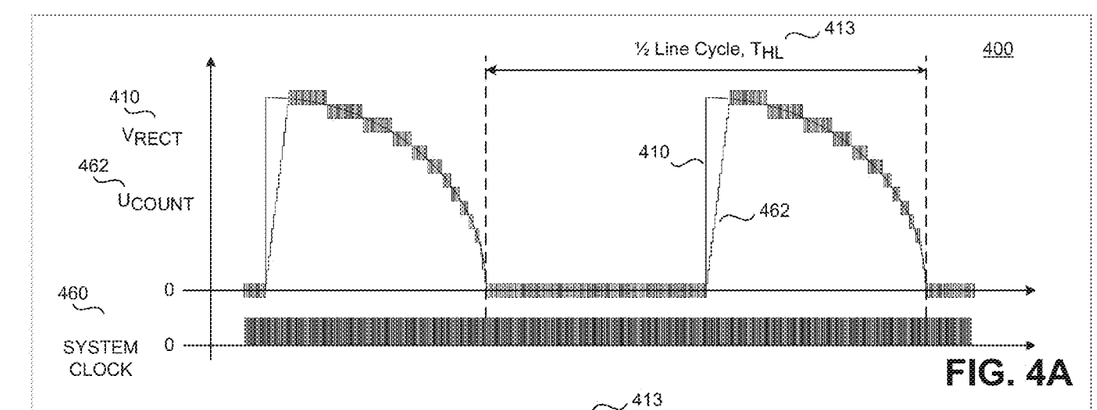
FIG. 4A is a diagram illustrating example waveforms of a rectified input voltage waveform, a system clock, and a count signal of the power converter of FIG. 1 when a leading edge dimmer circuit is utilized in accordance with an example of the present invention.

Referring next to FIG. 4A, example waveforms of the rectified voltage $V_{RECT}$ 410, system clock 460, and the count signal $U_{COUNT}$ 462 of the switching power converter 100 are illustrated including half line cycle $T_{HL}$ 413 and the system period $T_{SYS}$ 474. FIG. 4A illustrates the example rectified voltage $V_{RECT}$ 410 for a leading edge dimmer circuit.

The beginning of each half line cycle $T_{HL}$ 413 of the rectified voltage $V_{RECT}$ 410 is substantially equal to zero voltage corresponding to when the dimmer circuit 104 disconnects the ac input voltage $V_{AC}$ 102 from the power converter 100. When the dimmer circuit 104 reconnects the ac voltage $V_{AC}$ 102 to the power converter 100, the rectified voltage $V_{RECT}$ 410 substantially follows the positive magnitude of the ac input voltage $V_{AC}$ 102. Similar to FIGS. 3A and 3B, the count signal $U_{COUNT}$ 462 is a rectangular pulse waveform with multiple values. As shown, the count signal $U_{COUNT}$ 462 may partially track the rectified voltage $V_{RECT}$ 410. However, at the leading edge of the rectified voltage $V_{RECT}$ 410 (when the rectified voltage $V_{RECT}$ 410 increases from substantially zero to follow the positive magnitude of the ac input voltage $V_{AC}$ 102), the count signal $U_{COUNT}$ 462 is unable to track the rectified voltage $V_{RECT}$ 410. As illustrated, the count signal $U_{COUNT}$ 462 is less than the rectified voltage $V_{RECT}$ 410 for multiple periods of the system clock 460. In the illustrated example, the count signal $U_{COUNT}$ 462 is less than the rectified voltage $V_{RECT}$ 410 for fourteen consecutive periods of the system clock 460. As such, the count module 140 increments the count signal $U_{COUNT}$ 462 for fourteen consecutive periods and the value of the count signal $U_{COUNT}$ 462 increases for fourteen consecutive periods of the system clock 460. In other words, the count signal $U_{COUNT}$ 462 does not cross the rectified voltage $V_{RECT}$ 410 within N consecutive periods of the system clock 460 and an edge is detected. In one example, the count signal $U_{COUNT}$ 462 increasing for N or more consecutive system periods would correspond to a detected leading edge. The number of consecutive periods of the clock signal which the count signal $U_{COUNT}$ 462 is less than the rectified voltage $V_{RECT}$ 410 may be referred to as the leading edge count.

Figure 4B:
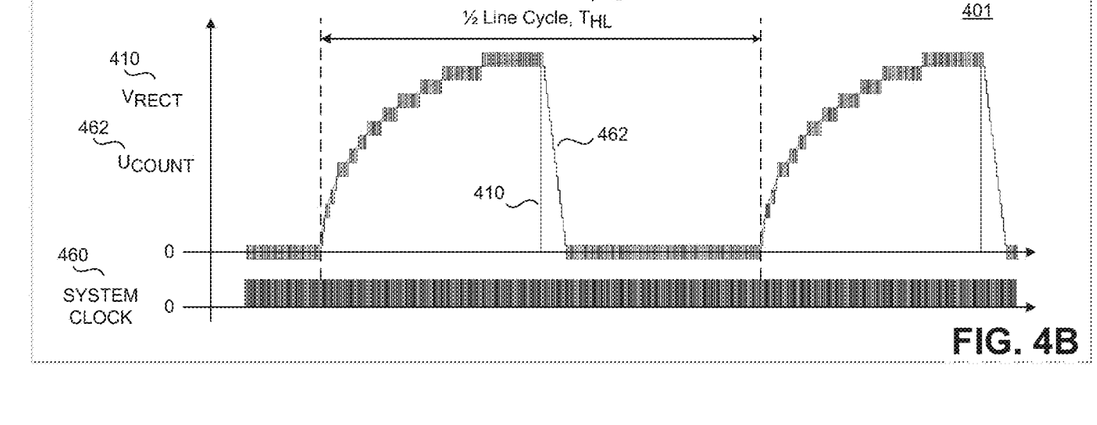
FIG. 4B is a diagram illustrating example waveforms of a rectified input voltage waveform, a system clock, and a count signal of the power converter of FIG. 1 when a trailing edge dimmer circuit is utilized in accordance with an example of the present invention.

Referring next to FIG. 4B, example waveforms of the rectified voltage $V_{RECT}$ 410, system clock 460, and the count signal $U_{COUNT}$ 462 of the switching power converter 100 are illustrated including half line cycle $T_{HL}$ 413 and the system period $T_{SYS}$ 474. FIG. 4B illustrates the example rectified voltage $V_{RECT}$ 410 for a trailing edge dimmer circuit.

FIG. 4B is similar to FIG. 4A, however the dimmer circuit 104 connects the input to the power converter 100 to the ac input voltage $V_{AC}$ 102 when the ac input voltage $V_{AC}$ 102 crosses zero voltage and after a given amount of time, the dimmer circuit 104 then disconnects the ac input voltage $V_{AC}$ 102 for the remainder of the half line cycle $T_{HL}$ 413. At the beginning of the half line cycle $T_{HL}$ 413, the rectified voltage $V_{RECT}$ 410 substantially follows the positive magnitude of the ac input voltage $V_{AC}$ 102 until the dimmer circuit 104 disconnects the ac input voltage $V_{AC}$ 102 from the power converter 100. The value of the rectified voltage $V_{RECT}$ 410 then falls to substantially zero voltage until the beginning of the next half line cycle. The decrease of the rectified voltage $V_{RECT}$ 410 may be referred to as the trailing edge. As shown, the count signal $U_{COUNT}$ 462 may partially track the rectified voltage $V_{RECT}$ 410. However, at the trailing edge of the rectified voltage $V_{RECT}$ 410, the count signal $U_{COUNT}$ 462 is unable to track the rectified voltage $V_{RECT}$ 410. As illustrated, the count signal $U_{COUNT}$ 462 is greater than the rectified voltage $V_{RECT}$ 410 for multiple periods of the system clock 460. In the illustrated example, the count signal $U_{COUNT}$ 462 is greater than the rectified voltage $V_{RECT}$ 410 for fifteen consecutive periods of the system clock 460. As such, the count module 140 decrements the count signal $U_{COUNT}$ 462 for fifteen consecutive periods and the value of the count signal $U_{COUNT}$ 462 decreases for fourteen consecutive periods of the system clock 460. In other words, the count signal $U_{COUNT}$ 462 does not cross the rectified voltage $V_{RECT}$ 410 within N consecutive periods of the system clock 460 and an edge is detected. In one example, the count signal $U_{COUNT}$ 462 decreasing for N or more consecutive system periods would correspond to a detected trailing edge. The number of consecutive periods of the clock signal which the count signal $U_{COUNT}$ 462 is greater than the rectified voltage $V_{RECT}$ 410 may be referred to as the trailing edge count.

Figure 5:
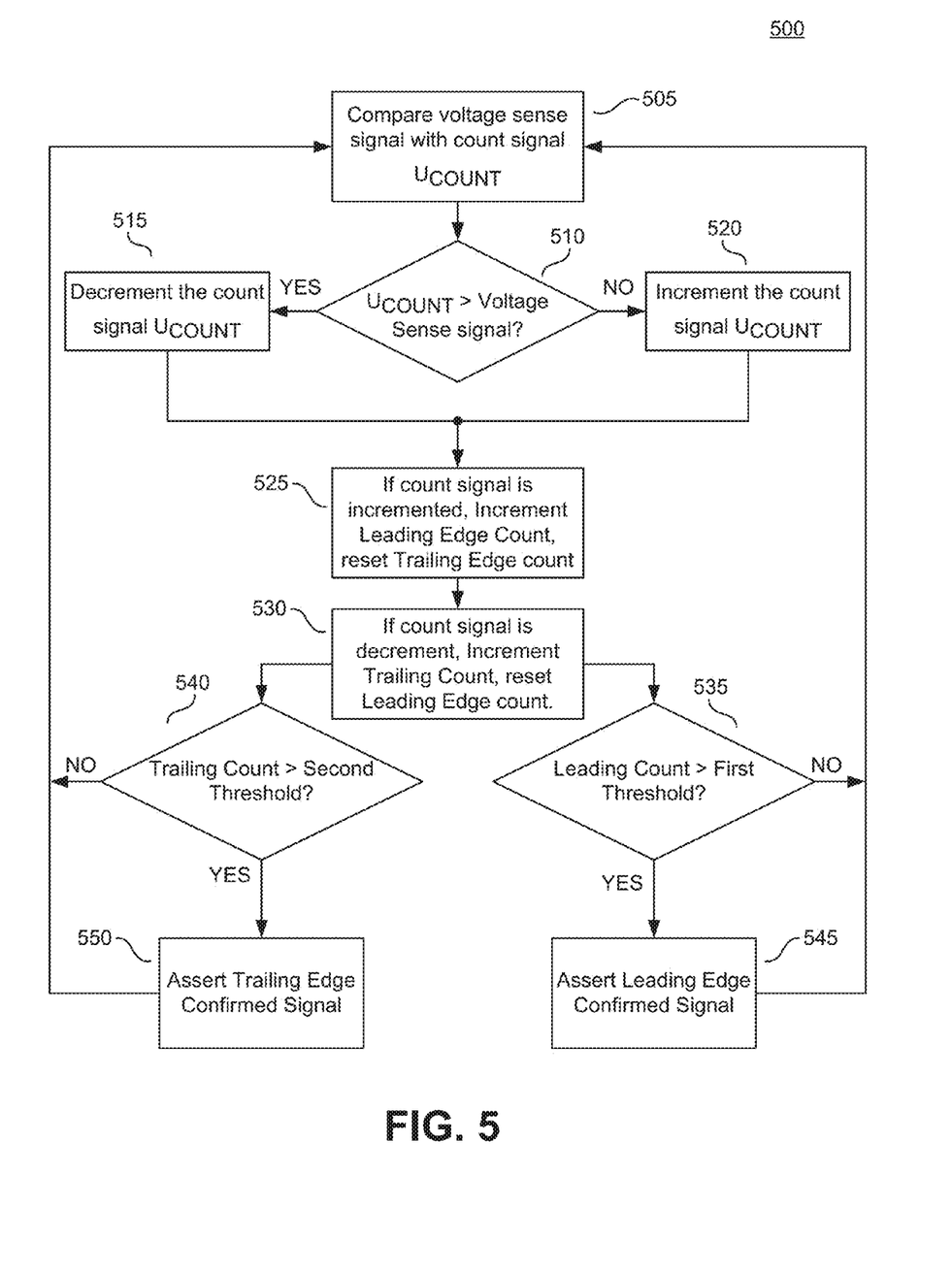
FIG. 5 is a flow diagram illustrating an example method for determining an edge in an input waveform in accordance with an example of the present invention.

FIG. 5 is a flow diagram illustrating an example process 500 for detecting an edge in an input waveform in accordance with an example of the present invention. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

In process block 505, the voltage sense signal (e.g. voltage sense signal 154) is compared with the count signal $U_{COUNT}$ (e.g. count signal $U_{COUNT}$ 162). In process block 510, process 500 determines whether the count signal $U_{COUNT}$ is greater than the voltage sense signal. If the count signal $U_{COUNT}$ is greater than the voltage sense signal, the process moves to block 515 and the count signal $U_{COUNT}$ is decremented or decreased. However, if the count signal $U_{COUNT}$ is not greater than the voltage sense signal, the process moves to block 520 and the count signal is $U_{COUNT}$ incremented or increased.

At block 525, if the count signal $U_{COUNT}$ is incremented, a leading edge count is also incremented (or increased) and a trailing edge count is reset to substantially zero. At block 530, if the count signal $U_{COUNT}$ is decremented, a leading edge count is reset to substantially zero and the trailing edge count is incremented (or increased). At block 535, the process determines if the leading edge count is greater than the first threshold (e.g. ten). If the leading edge count is not greater than the first threshold, the process returns to block 505. If the leading edge count is greater than the first threshold, the process asserts the leading edge confirmed signal (e.g. leading edge signal $U_{LE}$ 167) in block 545.

At block 540, the process determines if the trailing edge count is greater than the second threshold (e.g. 10). If the trailing edge count is not greater than the second threshold, the process returns to block 505. If the trailing edge count is greater than the second threshold, the process asserts the trailing edge confirmed signal (e.g. trailing edge signal $U_{TE}$ 168) in block 550. It should be appreciated that the first threshold and the second threshold may correspond to the N number of consecutive periods of the system clock which the count signal is unable to track the rectified voltage. In addition, the first threshold and the second threshold may be the same threshold.

Figure 6:
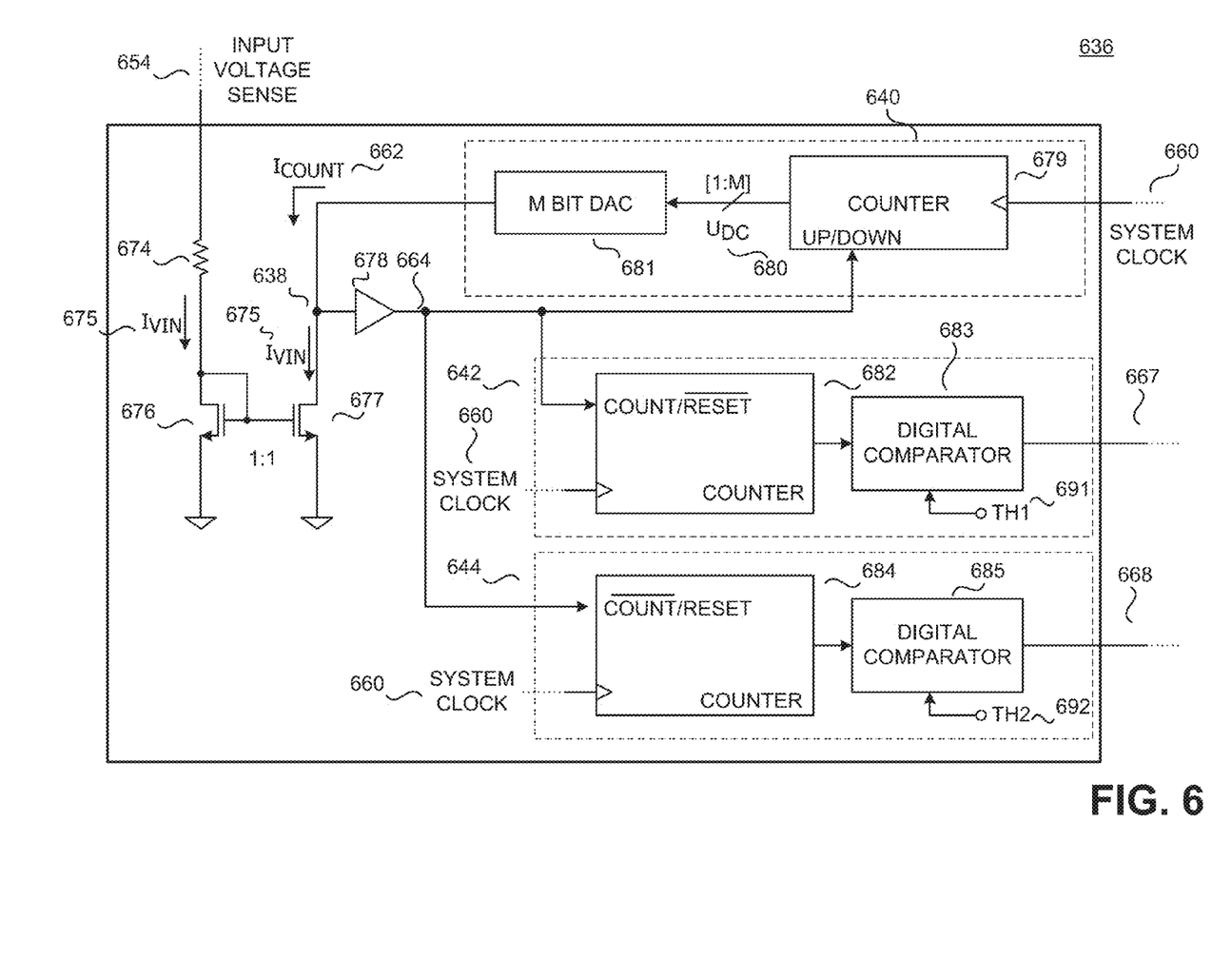
FIG. 6 is a function block diagram of an edge detection circuit of the controller for FIG. 1 in accordance with an example of the present invention.

FIG. 6 illustrates an example edge detection circuit 636 including a count module 640, leading edge check circuit 642, trailing edge check circuit 644, a resistor 674, a current mirror including transistors 676 and 677, and a driver 678. Count module 640 is shown including a counter 679 and an M bit DAC 681. Leading edge check circuit 642 includes counter 682 and digital comparator 683. In addition, trailing edge check circuit 644 includes counter 684 and digital comparator 685. FIG. 6 also includes input voltage sense signal 654, input voltage sense current $I_{VIN}$ 675, count signal $I_{COUNT}$ 662, system clock 660, comparator output 664 (i.e. compare signal 664), leading edge signal $U_{LE}$ 667 and trailing edge signal $U_{TE}$ 668, first threshold TH1 691, and second threshold TH2 692.

In one example, input voltage sense signal 654 may be a voltage signal. The resistor 674 is coupled to receive the input voltage sense signal 654 and convert the voltage signal to a current signal, shown as input voltage sense current $I_{VIN}$ 675. Transistors 676 and 677 are coupled together as a current mirror. In the example illustrated, the ratio of the current mirror is 1:1 however, other ratios may be used. The first transistor 676 is coupled to receive the input voltage sense current $I_{VIN}$ 675 and the input voltage sense current $I_{VIN}$ 675 is mirrored to the second transistor 677.

For the example of FIG. 6, the count signal $U_{COUNT}$ is exemplified as a current signal, count signal $I_{COUNT}$ 662. The comparator 138 is exemplified by the terminal 638 since both the count signal $I_{COUNT}$ 662 and the input voltage sense current $I_{VIN}$ 675 are current signals. One end of driver 678 is coupled to the terminal 638 and the output 664 (compare signal 664) of the driver 678 is received at counters 679, 682, and 684. In one example, the compare signal 664 is received at the UP/DOWN input of counter 679 and is received at the COUNT/RESET inputs of counters 682 and 684. As also shown in FIG. 6, each of counters 679, 682, and 684 also receive system clock 660 at their clock inputs.

In one example, the output of counter 679 is a digital word of M length and is referred to as digital count $U_{DC}$ 680. The digital count $U_{DC}$ 680 is coupled to be received by the M bit DAC 681 which converters the digital count $U_{DC}$ 680 to an analog signal. As illustrated, the digital count $U_{DC}$ 680 is converted to the count signal $I_{COUNT}$ 662 where magnitudes of the count signal $I_{COUNT}$ 662 correspond to a specific count of the digital count $U_{DC}$ 680.

The outputs of counters 682 and 684 are coupled to be received by digital comparators 683 and 685, respectively. The digital comparators 683 and 685 are also coupled to receive the first threshold TH1 691 and the second threshold TH2 692, respectively. As will be further discussed, digital comparator 683 is coupled to compare the output of counter 682 with the first threshold TH1 691. The output of digital comparator 683 is the leading edge signal $U_{LE}$ 667. A logic high value of the leading edge signal $U_{LE}$ 667 may correspond to the output of counter 682 being greater than the first threshold TH1 691 while a logic low value may correspond to the output of counter 682 being less than the first threshold TH1 691.

Similarly, the digital comparator 685 compares the output of the counter 684 with the second threshold TH2 692. The output of the digital comparator 685 is the trailing edge signal $U_{TE}$ 668. A logic high value of the trailing edge signal $U_{TE}$ 668 may correspond to the output of counter 684 being greater than the second threshold TH2 692 while a logic low value may correspond to the output of counter 684 being less than the second threshold TH2 692.

In operation, the input voltage sense current $I_{VIN}$ 675 is compared to the count signal $I_{COUNT}$ 662 at terminal 638. In one example, if the input voltage sense current $I_{VIN}$ 675 is greater than the count signal $I_{COUNT}$ 662, the voltage at terminal 638 is pulled high. The output 664 (count signal 664) of the driver 678 is a logic high value and the value stored in counter 679 is incremented. If the count signal $I_{COUNT}$ 662 is greater than the input voltage sense current $I_{VIN}$ 675, the voltage at terminal 638 is pulled low and the output 664 (compare signal 664) of the driver is a logic low value and the value stored in counter 679 is decremented.

When counter 679 receives a logic high value, the value of the digital count $U_{DC}$ 680 is incremented. When the counter 679 receives a logic low value, the value of the digital count $U_{DC}$ 680 is decremented. The M bit DAC 681 converts the digital count $U_{DC}$ 680 to an analog count signal $I_{COUNT}$ 662.

In one example, counter 682 of the leading edge check circuit 642 increments when the output 664 is logic high and resets when the output 664 is logic low. As such, the value of the counter 682 increases with every consecutive period of the system clock which the input voltage sense current $I_{VIN}$ 675 is greater than the count signal $I_{COUNT}$ 662. The output of the counter 682 is compared to a first threshold TH1 691. The digital comparator 683 outputs a logic high value when the output of counter 682 is greater than the first threshold TH1 691 and a logic low value otherwise.

Further, in one example the counter 684 of the trailing edge check circuit 644 increments when the output 664 is logic low and resets when the output 664 is logic high. As such, the value of the counter 682 increases with every consecutive period of the system clock which the count signal $I_{COUNT}$ 662 is greater than the input voltage sense current $I_{VIN}$ 675. The output of the counter 684 is compared to a second threshold TH2 692. The digital comparator 685 outputs a logic high value when the output of counter 684 is greater than the second threshold TH2 692 and a logic low value otherwise.

Figure 7:
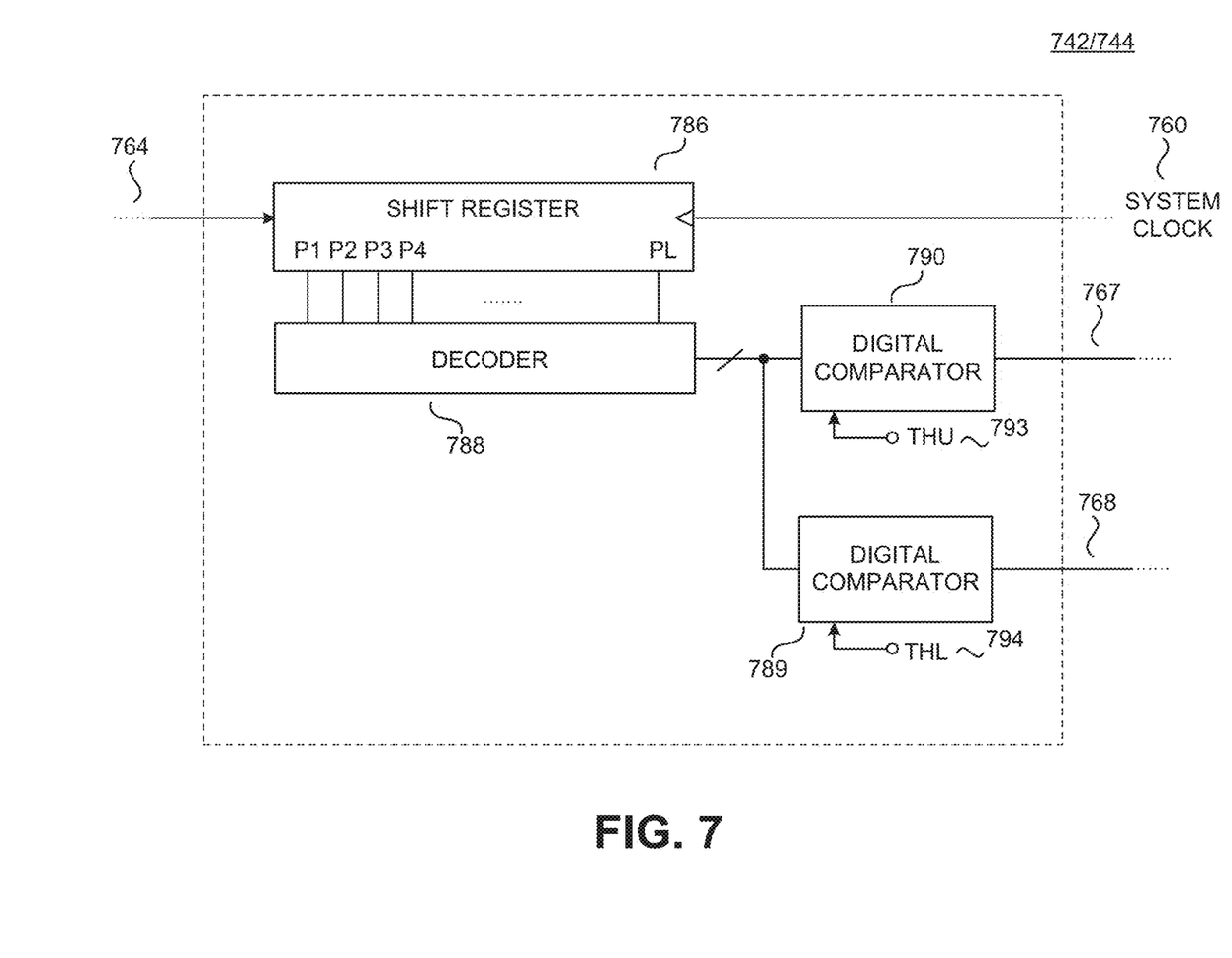
FIG. 7 is a functional block diagram of a leading edge check circuit and a trailing edge check circuit of the controller in accordance with an example of the present invention.

FIG. 7 illustrates an example leading edge check circuit 742 and trailing edge check circuit 744 including a shift register 786, decoder 788, digital comparator 790, and digital comparator 789. FIG. 7 also includes system clock 760, compare signal 764, the leading edge signal $U_{LE}$ 767, the trailing edge signal $U_{TE}$ 768, an upper threshold THU 793, and a lower threshold THL 794.

Shift register 786 is coupled to receive the compare signal 764 and the system clock 760 and also coupled to the decoder 788. As mentioned above, the compare signal 764 may be logic high or logic low depending on whether the input signal is greater than the count signal. Shift register 786 may include L number of registers (illustrated as P1, P2, P3, P4, PL) which may store L number of values of the compare signal 764. In one example, each register (P1, P2, P3, P4, PL) of the shift register 786 may be a one bit register. The values stored in each individual register of the shift register 786 may be received by the decoder 788. In one example, the decoder 788 may determine the number of (logic) ones stored in the shift register 786. Alternatively, the decoder may determine the number of (logic) zeros stored in the shift register 786. Digital comparators 789 and 790 are coupled to the decoder to receive the output of the decoder 788. The output of the digital comparator 790 is the leading edge signal $U_{LE}$ 767 while the output of digital comparator 789 is the trailing edge signal $U_{TE}$ 768. The leading edge signal $U_{LE}$ 767 and the trailing edge signal $U_{TE}$ 768 may be rectangular pulse waveforms with varying lengths of logic high and logic low sections. In one example, the leading edge signal $U_{LE}$ 767 may be logic high when a leading edge is detected or may pulse to a logic high value when a leading edge is detected. Further, in one example the trailing edge signal $U_{TE}$ 768 may be logic high when a trailing edge is detected or may pulse to a logic high value when a trailing edge is detected.

In operation, the individual registers of the shift register 786 are prestored with alternating logic high and logic low values (e.g. ones or zeros). For example, register P1 may be stored with a logic zero while register P2 is stored with a logic one and so on until register PL is stored with a logic one (if L is an even number) or a logic zero (if L is an odd number). In one example, L may be 32 and the shift register 786 is initially stored with alternating 16 logic zeros and 16 logic ones. As the shift register 786 updates (in response to the system clock 760), the shift register 786 stores the next value provided by the compare signal 764. The decoder 788 determines the number of logic ones (or logic zeros) stored in the shift register 786 and outputs the total number of logic ones (or logic zeros). The digital comparator 790 compares the total number of logic ones determined by the decoder 788 with the upper threshold THU 793 and asserts the leading edge signal $U_{LE}$ 767 when the total number of logic ones are greater than the upper threshold THU 793. Digital comparator 789 compares the output of the decoder 788 (total number of logic ones) with the lower threshold THL 794 and asserts the trailing edge signal UTE 768 when the total number of logic ones are less than the lower threshold THL 794. In an example, the value of the lower threshold THL 794 is less than the upper threshold THU 793.

In some examples, when the dimmer circuit (e.g. dimmer circuit 104) begins conducting, the input voltage may ring and change directions multiple times which may lead to a missed detection of the edge. In one example, the leading edge check circuit 742 and the trailing edge check circuit 744 monitors the density of logic one values. In other words, the leading edge check circuit 742 monitors the total number of logic one values stored within the shift register 786. If the total number of logic ones is greater than an upper threshold, a leading edge is detected. If the total number of logic ones is less than a lower threshold, a trailing edge is detected. Alternatively, the leading edge check circuit 742 and the trailing edge check circuit 744 may monitor the density of logic zero values. In other words, the trailing edge check circuit monitors the total number of logic zero values stored within the shift register and if the total number of logic zeros is greater than an upper threshold, a trailing edge is detected. However, if the total number of logic zeros is less than a lower threshold, a leading edge is detected. In both examples, the value of the lower threshold is less than the upper threshold.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A controller for a power converter, the controller comprising:
   an edge detection circuit including:
      a comparator coupled to output a compare signal in response to comparing an input sense signal and a count signal, wherein the comparator gives the compare signal a first state when the input sense signal is below the count signal and gives the compare signal a second state when the input sense signal is above the count signal, the input sense signal representative of an input voltage of the power converter;
      a count module coupled to adjust the count signal to track the input sense signal in response to receiving the compare signal; and
      an edge checking module coupled to output at least one edge signal in response to the compare signal not changing between the first and the second state for a given time period; and
   a drive circuit coupled to output a drive signal in response to the at least one edge signal, wherein the drive signal is for controlling a switch coupled to regulate an output of the power converter.

2. The controller of claim 1, wherein the count module decreases the count signal when the compare signal has the first state, and wherein the count module increases the count signal when the compare signal has the second state.

3. The controller of claim 1, wherein the edge checking module includes a trailing edge block coupled to output a trailing edge signal when the compare signal is at the first state for at least the given time period, the at least one edge signal including the trailing edge signal.

4. The controller of claim 3, wherein the trailing edge block includes:
   a first counter coupled to output a first counter output in response to the compare signal, wherein the first counter output is periodically incremented when the compare signal is at the first state, and wherein the first counter output is reset when the compare signal changes from the first state to the second state; and
   a first digital comparator coupled to assert the trailing edge signal when the first counter output reaches a given threshold representative of the given time period, wherein the given threshold is an integer.

5. The controller of claim 1, wherein the edge checking module includes a leading edge block coupled to output a leading edge signal when the compare signal is at the second state for at least the given time period, the at least one edge signal including the leading edge signal.

6. The controller of claim 5, wherein the leading edge block includes:
a second counter coupled to output a second counter output in response to the compare signal, wherein the second counter output is periodically incremented when the compare signal is at the second state, and wherein the second counter output is reset when the compare signal changes from the second state to the first state; and
a second digital comparator coupled to assert the leading edge signal when the second counter output reaches a given threshold representative of the given time period, wherein the given threshold is an integer.

7. The controller of claim 1 further comprising an oscillator coupled to generate a system clock, wherein the count module and the edge checking module are coupled to receive the system clock, and wherein the count module adjusts the count signal in response to the system clock.

8. The controller of claim 7, wherein the given time period is ten cycles of the system clock.

9. The controller of claim 1, wherein the count module includes a counter coupled to output a digital word of N length in response to the compare signal, the count module further including a digital-to-analog converter ("DAC") coupled to output the count signal in response to the digital word, wherein the count signal is an analog signal.

10. The controller of claim 1, wherein the controller and the switch are included in an integrated circuit.

11. The controller of claim 1, wherein the edge checking module includes:
a register coupled to receive the compare signal and to store L number of values of the compare signal and output the L number of values;
a decoder coupled to receive the L number of stored values and determine a total number of the L number of values which are substantially equal to the first state; and
a comparator coupled to receive the total number and to assert a trailing edge signal when the total number reaches a lower threshold.

12. The controller of claim 1, wherein the edge checking module includes:
a register coupled to receive the compare signal and to store L number of values of the compare signal and output the L number of values;
a decoder coupled to receive the L number of stored values and determine a total number of the L number of values which are substantially equal to the second state; and
a comparator coupled to receive the total number and to assert a leading edge signal when the total number reaches an upper threshold.

13. A method of operating a controller of a power converter, the method comprising:
receiving an input sense signal;
generating a compare signal based on a comparison of the input sense signal and a count signal;
adjusting the count signal to track the input sense signal, wherein the adjusting is based on the compare signal; and
outputting at least one edge signal in response to the compare signal not changing states for a given time period, wherein a switch coupled to regulate an output of the power converter is responsive to the at least one edge signal.

14. The method of claim 13, wherein the compare signal has a first state when the input sense signal is below the count signal, and wherein the compare signal has a second state when the input sense signal is above the count signal, and further wherein said adjusting the count signal includes decreasing the count signal when the compare signal has a first state and increasing the count signal when the compare signal has a second state.

15. The method of claim 14, wherein a trailing edge signal is outputted when the compare signal is at the first state for at least the given time period, the at least one edge signal including the trailing edge signal, and wherein outputting the trailing edge signal indicates that a leading edge dimmer is providing the input sense signal.

16. The method of claim 14, wherein a leading edge signal is outputted when the compare signal is at the second state for at least the given time period, the at least one edge signal including the leading edge signal, and wherein outputting the leading edge signal indicates that a trailing edge dimmer is providing the input sense signal.

17. The method of claim 13, wherein the given time period is an integer number of cycles of a clock.

18. A switched mode power converter comprising:
a switch;
an energy transfer element coupled to the switch and coupled to receive an input sense signal; and
a controller coupled to the switch to regulate an output of the switched mode power converter in response to a dimming signal, wherein the controller includes:
an edge detection circuit including:
a comparator coupled to output a compare signal in response to comparing the dimming signal and a count signal, wherein the comparator gives the compare signal a first state when the dimming signal is below the count signal and gives the compare signal a second state when the dimming signal is above the count signal, the dimming signal representative of an input voltage of the switched mode power converter;
a count module coupled to adjust the count signal to track the dimming signal in response to receiving the compare signal; and
an edge checking module coupled to output at least one edge signal in response to the compare signal not changing between the first and the second state for a given time period; and
a drive circuit coupled to output a drive signal in response to the at least one edge signal, wherein the drive signal is for controlling a switch coupled to regulate an output of the switched mode power converter.

19. The switched mode power converter of claim 18, wherein the count module decreases the count signal when the compare signal has the first state, and wherein the count module increases the count signal when the compare signal has the second state.

20. The switched mode power converter of claim 18, wherein the edge checking module includes a trailing edge block coupled to output a trailing edge signal when the compare signal is at the first state for the given time period, the at least one edge signal including the trailing edge signal.

21. The switched mode power converter of claim 18, wherein the edge checking module includes a leading edge block coupled to output a leading edge signal when the compare signal is at the second state for the given time period, the at least one edge signal including the leading edge signal.

22. The switched mode power converter of claim 18, wherein the edge checking module includes:
- a register coupled to receive the compare signal and to store L number of values of the compare signal and output the L number of values;
- a decoder coupled to receive the L number of stored values and determine a total number of the L number of values which are substantially equal to the first state; and
- a comparator coupled to receive the total number and to assert a trailing edge signal when the total number reaches a lower threshold.

23. The switched mode power converter of claim 18, wherein the edge checking module includes:
- a register coupled to receive the compare signal and to store L number of values of the compare signal and output the L number of values;
- a decoder coupled to receive the L number of stored values and determine a total number of the L number of values which are substantially equal to the second state; and
- a comparator coupled to receive the total number and to assert a leading edge signal when the total number reaches an upper threshold.

* * * * *